US005312083A

United States Patent [19]

Ekman

[11] Patent Number: 5,312,083

[45] Date of Patent: May 17, 1994

[54] ARRANGEMENT IN A MEDIA-CONDUCTING UNIT

[76] Inventor: Thure Ekman, Slalomvägen 12, 541 33 Sköde, Sweden

[21] Appl. No.: 57,772

[22] Filed: May 6, 1993

[30] Foreign Application Priority Data

May 7, 1992 [SE] Sweden ............................ 9201440-6

[51] Int. Cl.[5] ............................................ F16K 21/02

[52] U.S. Cl. ............................. 251/149.1; 137/513.5

[58] Field of Search ......................... 251/149.1, 149.2; 137/513.5, 459, 460

[56] References Cited

U.S. PATENT DOCUMENTS 2,807,279 9/1957 Presnell ........................ 137/513.5 X
4,643,222 2/1987 Wiser ................................ 137/528
4,703,774 11/1987 Seehausen ...................... 137/614.04
4,811,756 3/1989 Hall ............................. 137/513.5 X
5,211,192 5/1993 Jorgensen ......................... 137/513.5

FOREIGN PATENT DOCUMENTS 1529614 of 0000 United Kingdom .
2116293 of 0000 United Kingdom .
2139326 11/1984 United Kingdom ............. 137/513.5
2249610 5/1992 United Kingdom .

*Primary Examiner*—Gerald A. Michalsky
*Assistant Examiner*—Kevin L. Lee
*Attorney, Agent, or Firm*—Pollock, Vande Sande & Priddy

[57] ABSTRACT

A device in fluid-conducting unit for use in a supply line for carrying fluid with pressure from a source of the fluid to a tool comprises a coupling member having first and second open ends and a fluid passageway extending between the open ends. The fluid passageway has inner walls defining first and second sections with the second section having a larger diameter than the first section. A sloped surface connects the walls of the first section with the walls of the second section and a convergingly-shaped hub body is mounted within the second section for longitudinal movement therein between a first position of the hub body at the second end for providing a large fluid exhaust area and a second position at the first end for providing a reduced exhaust area, the convergingly shaped hub body being provided with a first end adjacent to engage the sloped surface and a plurality of spaced-apart wings projecting from the hub body to the inner walls of the second section, the wings interacting with the sloped surface at their front edges and having a longitudinally extending elongate outer surface for engaging the inner wall of the second section.

20 Claims, 3 Drawing Sheets

ARRANGEMENT IN A MEDIA-CONDUCTING UNIT

TECHNICAL FIELD

The present invention relates to a medium-conducting unit in or on which a first part for controlling the medium conduction is mounted in a longitudinally displaceable manner in relation to a second part. The unit can be a quick-coupling unit connectable to a pressure source with quick-coupling function, a mouthpiece and so forth.

BACKGROUND OF THE INVENTION

Quick couplings with displaceable inner parts are already well known. However, the present unit is to be used in connection with a pressure source, preferably for air, with the aid of which tools, elements and the like, are to be operated. The unit supplies the medium in question, conducted via a hose from the unit to the tool in question or the like. The unit can also include a nozzle, for example a nozzle for air blasting. The nozzle can be connected to a suitable pressure source via a hose or another line.

ACCOUNT OF THE INVENTION

Technical Problem

In this type of equipment, there is a requirement for the unit to be constructed for large media conduction which provides an adequate media supply to the air tool or the like. The consumption of media occurs when the tool is activated. When the tool not activated, there is no media consumption and the media pressure remains in the connecting line to the tool. Decoupling of the tool is carried out by discontinuing the connection to the pressure source. It is important in this context that the remaining media in the connection system to the tool is released so that a person observing that the pressure source is uncoupled is not caught by the tool being set in motion by the unintentional activation of its activating element. It is thus important that the pressure of the confined media is relieved so that the tool cannot be set in motion or function long after the disconnection of the pressure source has been carried out. The case in which media pressure remains in the feed hose to the tool can bring with it high risks of accidents. It must be possible to relieve the enclosed media within a relatively short time, for example within a few seconds to a few minutes after the uncoupling of the pressure source has taken place. Such a release of media pressure must not cause high sound levels which can damage the hearing or create discomfort from the hearing point of view.

In the case of a nozzle for air blasting, it is also important to achieve high through-flow cross sections in the nozzle while at the same time preventing damaging or uncomfortable acoustic effects due to the outflow of air in the nozzle. The nozzle must be able to operate with a sustained high desired blasting force.

SUMMARY OF THE INVENTION

The present the invention is aimed to solve the above problems. The main characterizing feature of the novel device is that the first part mentioned in the introduction is arranged in such a manner that, depending on a pressure change in the media or a relative longitudinal displacement effect between the first and second parts, it takes up an end or shutting-off position where media located behind the first part can pass out to the surrounding atmosphere for relieving the pressure of the media during a predetermined time which produces a low sound level, for example a sound level below 60 dB (decibels), during the said media pressure release or where media enclosed behind the first part due to the displacement of the first part are prevented from passing to the surrounding atmosphere or only pass to the surrounding atmosphere to a limited extent.

In one embodiment of the novel device, the first part is constructed with an essentially bobbin-shaped hub body and wings projecting from the hub by means of which the first part is mounted in a longitudinally displaceable manner on an inner wall in the second part. On connection of the unit to a pressure source which, via the unit, is intended to supply power to elements (tools), which can be activated by media pressure and which are also connected to the unit, the first part assumes a first position in which maximum media conduction can be effected. When the unit is uncoupled from the pressure source, the first part assumes the end position due to the pressure in the media which is present behind the first part at the uncoupling. The passing out of the media behind the first part to the surrounding atmosphere, produced in the end position, provides a release of pressure towards the element or elements which can be activated by media pressure, which elements are thereby prevented from carrying out their functions after the uncoupling of the pressure source.

In a further embodiment, the unit can be connected to a pressure source and the element or tool which can be activated by media pressure via first and respectively second connection ends on the unit. The larger end of the bobbin-shaped hub body is directed towards the pressure source and its narrowing end towards the element.

In a further embodiment, the second part is constructed with a seat part and a first part can interact with the seat part at its larger end. One or more recesses for passage of the media in the end position are arranged between the body and the seat part. In a further embodiment, the bobbin-shaped body is constructed at its larger end with one or more slots or depressions located outside, via which the passage of media can be effected in the end position. The larger end of the bobbin-shaped hub body and the front edge of the wings, or corresponding elements, protruding from the body are arranged in such a manner that the front edges of the wings protrude essentially tangentially from the front part of the larger end and the front edges slope backwards/upwards as seen from the larger end. The back ends of the wings can in this context extend backwards to essentially the same level as the back part of the narrowing part of the hub body. The bobbin-shaped hub body can also be constructed with an essentially conical back part and the back edges of the wings can then extend from the center parts of the conical back part.

In a preferred embodiment, the slots or recesses preferably extend axially on the outside of the bobbin-shaped hub body and between a position in front of the front edges of the wings to a position slightly in front of, or at the same level as, the back edges of the wings at their attachments to the bobbin-shaped hub body. In addition the seat part in the second part effects a spread-out seat function with a spread-out contact area for the front edges of the wings, and that in the end position, the said spread-out contact area is present at the same time as parts of the larger part of the bobbin-shaped hub body project past the seat contact area and the slots or recesses open out on both sides of the seat contact area.

In a further embodiment of the present invention, the fixed part can be constructed with a center part and a cylindrical part arranged on the outside of this, center part and wing-shaped elements or materials connecting the said parts, wherein, in the last-mentioned case, at least one preferably elongated hole for media passage is arranged. The cylindrical part extends towards the rear behind the center part and is mounted in a longitudinally displaceable and sealed manner on the second part. A part directed forward on the second part can interact with a rear part on the center part in the shutting-off position which can be effected by means of an external shutting action produced manually or by means of a spring function.

The device proposed above produces a large media supply capacity while at the same time the sound levels can be kept low when the media is passing out of the device to the surrounding atmospheric air. The nozzle can operate with a system pressure of, for example, 2–10 bar.

An embodiment, proposed at present, of a device which exhibits the characteristic features significant of the present invention will be described below, at the same time referrinq to the attached drawing in which:

DETAILED DESCRIPTION OF THE PREFERRED EMBODIMENT

Figure 1:
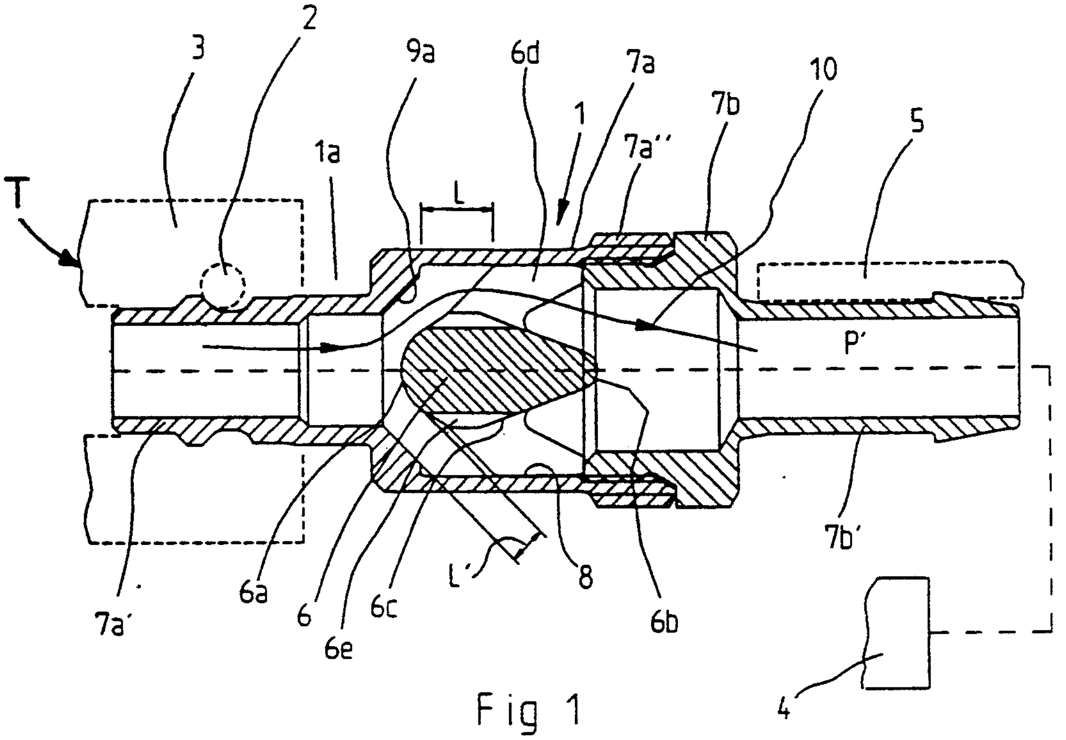
FIG. 1 shows in longitudinal section a first embodiment of a coupling unit with an inner first part arranged in a longitudinally displaceable manner in an opening position.

A coupling unit is shown as 1 in FIG. 1. The coupling unit can be connected via a quick-coupling function 2, in a known manner, to a pressure source T, the connection unit of which (for example female coupling) is indicated by 3. Since the quick-coupling elements are already well known, they will not be described in detail. The connection of the coupling unit 1 to the pressure source can be effected at the first end 1*a* of the coupling unit. The coupling unit can also be connected to one or more tools 4 which can consist of media-driven tools, for example air-driven tools. The connection to the tools is made via a hose 5, a pipeline system or the like. The coupling unit 1 is provided with a first part 6 which is mounted in a longitudinally displaceable manner in a second part 7*a*, 7*b* which can be built of two parts 7*a* and 7*b*, respectively, which can be assembled together. The part 7*a* has an inner wall 8 in which the first part is mounted to be longitudinally displaceable between an open position according to FIG. 1 and a position according to FIG. 2. The part 7*a* can be cylindrical and is provided at its one end 7*a*' with a nipple-shaped part for the quick-coupling function. At its other end 7*a*", the part 7*a* is coupled together with the part 7*b*. The coupling together is carried out in a known manner and the parts are sealed in a similarly known manner. The part 7*b* is provided with a nipple part 7*b*' to provide a possibility for connecting the hose 5, pipe system or the like. The first part is essentially bobbin-shaped and has its larger hemispherically shaped end 6*a* directed towards the pressure source T. The narrowed-down end 6*b* is directed towards the tool 4. The hub-shaped body is also constructed with an essentially conical part 6*c*. The bobbin-shaped hub body 6 is also provided with wings 6*d* by means of which the hub body is mounted against the said inner wall 8. The number of wings can vary, for example between 2–4 and is preferably 3. The hub body is provided with axial slots or depressions 6*e* located on the outside, the number of which can vary. The number of slots is preferably between 2–10.

Figure 2:
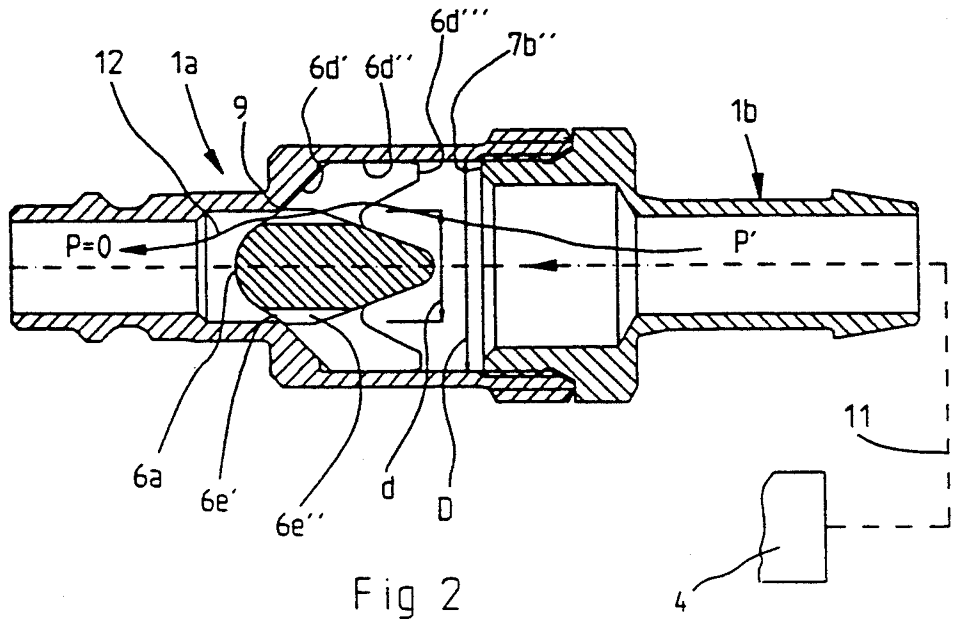
FIG. 2 shows in longitudinal section the coupling unit according to FIG. 1, but with the first part in an end position, in which a minimized media flow-through is effected from the hose towards the tool and to the surrounding atmosphere.

In the position according to FIG. 2, the hub body extends past a seat 9 arranged in the second part. The seat is constructed with spread-out contact area for, among others, the front edges 6*d*' of the wing-shaped elements. In the longitudinal sections shown in FIGS. 1 and 2, the front edges extend from the essentially tangential directions of the hemispherically-shaped surface 6*a*. The front edges extend backwards/upwards and change into axial parts 6*d*" which interact with the inner surface 8 of the second part 7*a*, 7*b*. The wings are terminated at the rear with end edges 6*d*"' by means of which the opening position according to FIG. 1 can be defined in an interaction with an inner surface 7*b*" on part 7*b*. The slots 6*e* open out on both sides of the seat 9 according to FIG. 2. The openings of the respective slots have been designated as by 6*e*' and 6*e*". In the opening position according to FIG. 1, the end 6*b* of the narrowing part of the hub body assumes a position which lies at the same level as the inner end surface 7*b*". The stroke movement of the first part 6 is specified by L. A distance L' between the seat surface 9*a* and the outer surf ace of the hub body is selected to provide a large media flow-through in the position shown in FIG. 1. On the pressure source side, a media pressure exists which is specified by P. on the tool connection side, the pressure is lower when the element/tool is activated and is specified by P'. The pressure P is higher and the pressure difference P—P" causes the first part 6 to be actuated to assume the position according to FIG. 1. The air (the medium) flowing in from the pressure source is indicated by the arrow 10. The media flow-through according arrow 10 is present as soon as the tool 4 is actuated and consumes media. The media is deflected on the bobbin-shaped body and the inside dimensions of the coupling unit 1 and the outside dimensions of the first part are selected to produce a media flow-through which is optimum for the size of the coupling unit.

In FIG. 2, it is assumed that the pressure source T according to FIG. 1 has been uncoupled. This causes the pressure P on the coupling unit side 1*a* to be equal to 0 (actually the atmospheric pressure). If the tool 4 is left unactuated when the pressure source is uncoupled, media pressure will remain in the connection 11 to the tool. This thus entails that an overpressure P' exists on the other side 1*b* of the unit. For the media pressure not to remain in the connection 11 for any prolonged time, the venting function comes into operation. Uncoupling of the pressure source must not cause a strong sound effect. This drawback is eliminated by the design of the coupling unit with the said first part 6. The media pressure can be punctured through the slots 6*e* during a predetermined desired time which is related to the sound level required to exist on uncoupling the pressure source. The size of the slots as well as the number of slots can thus be included in the determination of the said acoustic effect. The media pressure release can be carried out during a predetermined time which is preferably approximately 30 seconds. After this time, there is no risk that the tool carries out strokes or movements after uncoupling of the pressure part. The pressure difference "P'−P''" entails that the first part 6 assumes the position according to FIG. 2 and that an air outflow according to arrow 12 can be effected via the slots. The inner seat diameter d is related to the diameter D of the bearing wall 8. These values are significant for optimum media flow-through accord FIG. 1. In the present case, D is approximately equal 2×d.

Figure 3:
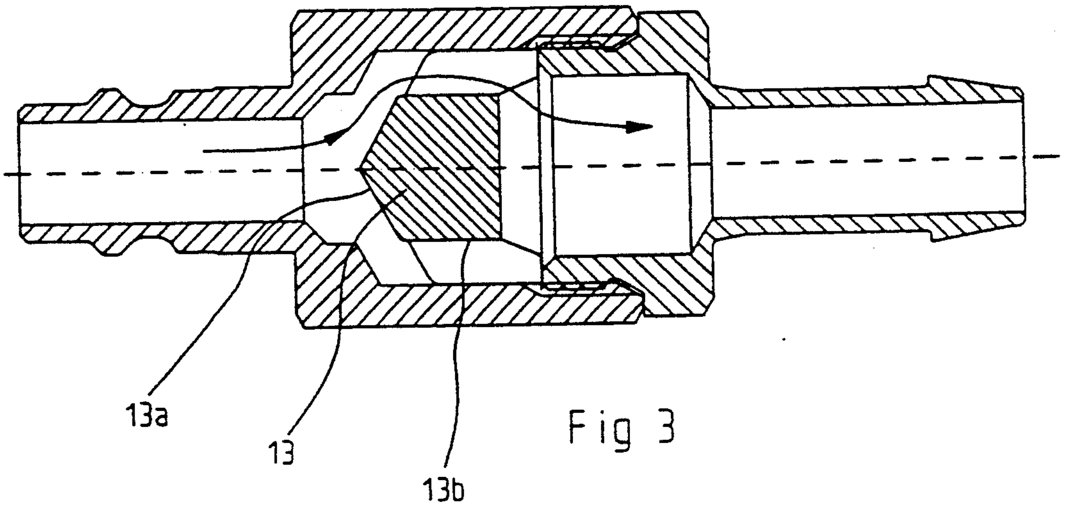
FIG. 3 shows in longitudinal section a second embodiment of the coupling unit in which the longitudinally displaceable inner part assumes a position which corresponds to the position according to FIG. 1.
Figure 4:
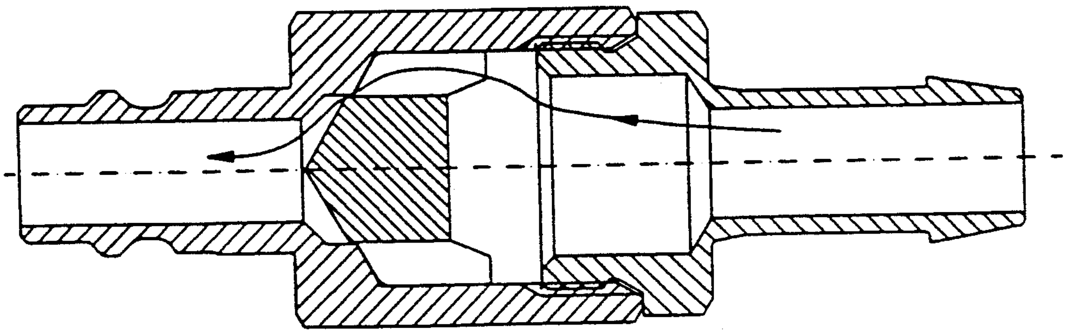
FIG. 4 shows in longitudinal section the coupling unit according to FIG. 3 but with the first part in the said second position.

In the embodiment according to FIGS. 3 and 4, the first part 13 given a different design. In this case, a conical front part 13*a* changes into a cylindrical part 13*b*. The cylindrical part carries the said wings which have essentially corresponding extents as those in the embodiment according to FIGS. 1 and 2. The functions of the embodiment according to FIGS. 3 and 4 essentially correspond to the functions of FIGS. 1 and 2.

Figure 6:
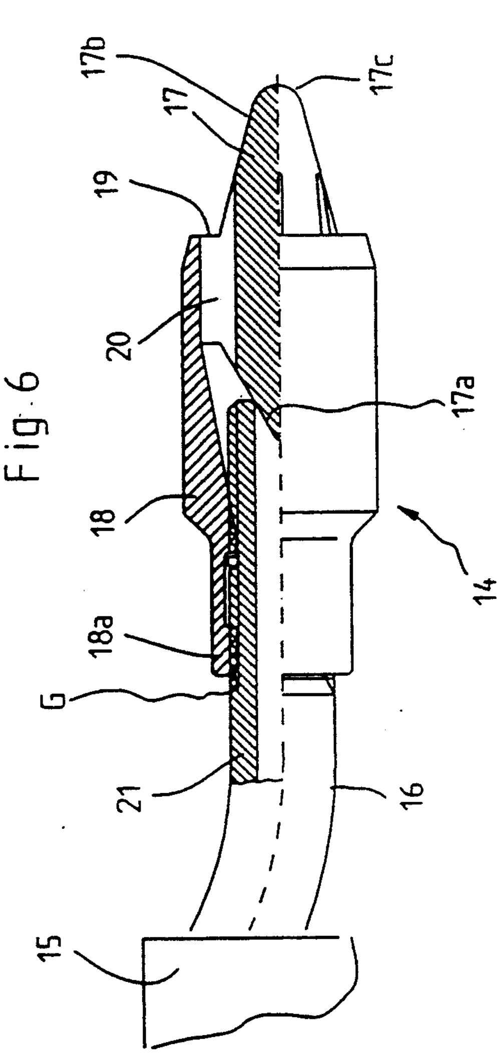
FIG. 6 shows in longitudinal section the nozzle according to FIG. 5 but with the media passage closed.
Figure 5:
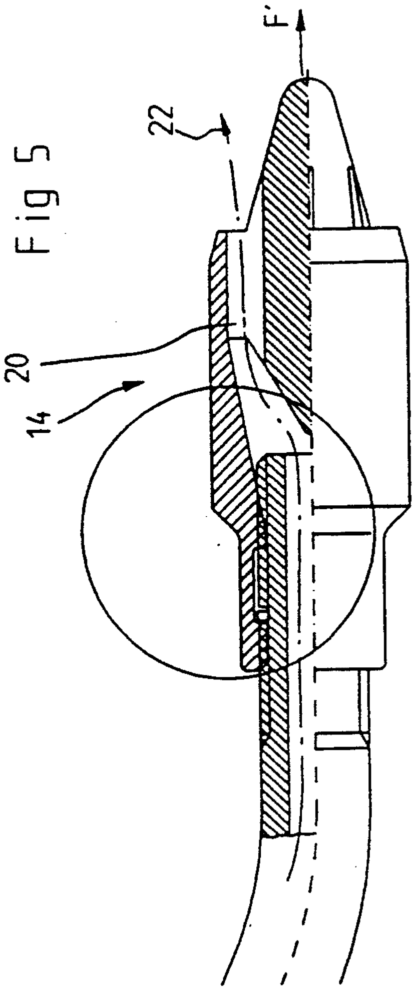
FIG. 5 shows in longitudinal section a nozzle for media blasting (air blasting), in which the passage for outflowing media is open.
Figure 5A:
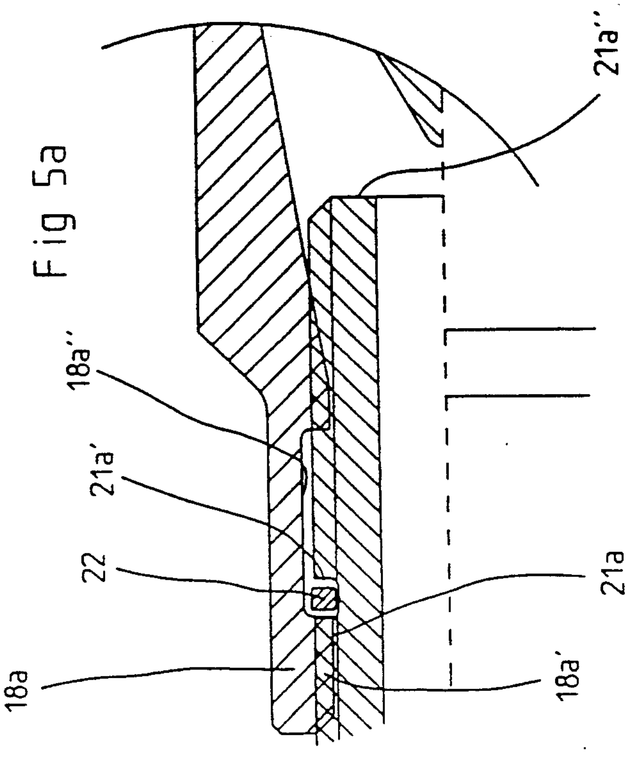
FIG. 5*a* shows an enlargement of parts of the nozzle according to FIG. 5.

In the embodiment according to FIGS. 5, 5*a* and 6, a media blow-out nozzle is shown. The nozzle is shown as 14 and is connected to a symbolically indicated pressure source 15 via a pipe 16, a hose, a connection system or the like. The first part in this embodiment consists of a center part 17 and a cylindrical part 18 surrounding this center part, and an element 19, connecting these parts 17 and 18, which element can be constructed of wing-shaped elements or of material in the nozzle shell. The nozzle is provided with a number of axial holes 20 which extend from the inside of the nozzle to the surrounding atmosphere. The part 18 is in this case mounted on the outside of a second part 21 which, in turn, is attached to the hose 16, pipe system or the like. The part 18 is provided at the rear with a bearing part 18*a* which, in turn, is provided with an interposing rear lip 18*a*' which is guided in corresponding longitudinal tracks 21*a* in the second part. The second part also exhibits a front surface 21*a*' which constitutes the end wall of the said track 21*a*. A seal 22 is inserted between an inner surface 18*a*'' on the first part and an outer surface in the track 21*a*. The track, lip and seal are thereby arranged in such a manner that the first part 17, 18 is arranged in a longitudinally displaceable manner on the second part 21, with sealing between the parts at the same time being produced by means of the seal 22. In the case shown, the parts 18, 21 have interacting threads G by means of which the mutual longitudinal displacement position of the parts can be adjusted by means of screw movement on the part 17, 18 relative to the part 21. Thus, a controllable blow-out passage exists.

The center part 17 shows an inner inclined surface 17*a* which can be brought into interaction with a front surface or front edge 21*a*'' on the second part. The passage between the pressure source 15 and the atmosphere is closed off in conjunction with this interaction. This interaction is produced when the first part 17, 18 is moved backwards relative to the second part 21, see FIG. 6. This interaction can be assumed to exist when the pressure source 15 is uncoupled and an external manual force F (for example produced by the said screwing function), a returning force not specially shown, and so forth, has been applied to the first part relative to the second part. When the pressure source 15 is coupled in, media flow-out occurs if the passage/passages are opened in accordance with the above. In an alternative embodiment, the pressure acts on the said inclined surface 17*a* and thereby causes a longitudinal displacement force F' relative to the first and second parts. The media can thereby flow out via the holes 20 in accordance with the direction of the arrow 22. The holes 20 are at the bottom sunk down in the nose of the center part 17. The part 17 has a forwardly directed conical shape 17*b* which changes into a spherical surface 17*c* at the front.

The interaction between the forward surface 21*a*'' and the inclined surface 17*a* occurs in connection with the central parts of the latter.

The units 1, 14 specified above are constructed of metal, alloy, plastic or other durable material.

The invention is not limited to the embodiment shown by way of example above but can be subjected to modifications within the scope of the following patent claims and the concept of the invention.

I claim:

1. A device in fluid-conducting unit for use in a supply line for carrying fluid with pressure from a source of said fluid to a tool comprising:

a) a coupling member having first and second open ends and a fluid passageway extending between said open ends, said fluid passageway having inner walls defining first and second sections, said second section having a larger diameter than said first section;

b) a sloped surface connecting the walls of said first section with the wall of said second section;

c) a convergingly-shaped hub body mounted within said second section for longitudinal movement therein between a first position of said hub body at said second end for providing a large fluid exhaust area and a second position at said first end for providing a reduced exhaust area, said convergingly-shaped hub body being provided with a first end adjacent to engage said sloped surface and a plurality of spaced-apart wings projecting from said hub body to the inner walls of said second section, said wings interacting with said sloped surface at their front edges and having a longitudinally extending elongate outer surface for engaging said inner wall of said second section.

2. A device according to claim 1, wherein said hub body is bobbin-shaped.

3. A device according to claim 1, wherein said reduced exhaust area provides a reduced flow of medium therethrough in such a manner that a low sound level up to approximately 60 dB is emitted.

4. A device according to claim 2, wherein the device is connected to a pressure source and to the tool through first and second connecting ends on the device respectively, and wherein the first end which is the larger end of the hub body is directed towards the pressure source and its narrowed-down end is directed towards the tool.

5. A device according to claim 4, wherein said sloped surface constitutes a seat part, and the hub body interacts with said seat part at its larger end, and wherein at least one opening is provided between the hub body and the seat part for medium flow when said hub body is in said second position.

6. A device according to claim 5, wherein the hub body is designed at said first larger end with at least one slot or recess located on the outside to provide said least one opening.

7. A device according to claim 2, wherein the first larger end of the bobbin-shaped hub body and front edges of the wings extending form the hub body are designed such that said front edges of the wings extend essentially in a tangential direction from the front part of the first larger end of the hub body and slope rearwardly and outwardly with respect to the larger end.

8. A device according to claim 7, wherein the rear edges of the wings extend rearwardly to essentially the same extent as the rear part of the narrowed-down end of the bobbin-shaped hub body.

9. A device according to claim 1, wherein the hub body is constructed with a first essentially conical part and the rear edges of the wings extend from substantially the central part of said conical part.

10. A device according to claim 7, wherein the angle of said tangential direction of the front edges of the wings corresponds to the angle of said sloped surface forming said seat part such that said front edges of said wings engage said seat part in said second position of said hub body.

11. A device according to claim 6, wherein said at least one slot or depression extend axially at the periphery of the hub body and between a location from in front of the front edges of the wings to a location slightly in front of or at the same level as the connection of the rear edges of the wins to the hub body.

12. A device according to claim 3, wherein the seat part effects a spread-out seat function with a spread-out seat contact area for the front edges of the wings, and in the second position, said spread-out contact area being present at the same time when parts of the first larger end of the hub body project past the seat part contact area and slots or recesses open out on both sides of the seat contact area.

13. A coupling member for connection to a conduit carrying a pressurized fluid comprising:

a cylindrical shell affixed to an end portion of said conduit, said shell having an outer cylindrical surface and a front end wall; and a nozzle slidably mounted over said cylindrical shell, said nozzle comprising an outer cylindrical element having an inner wall defining a bore for flow of fluid therethrough said cylindrical element slidably engaging said outer wall of said cylindrical shell, an axially-aligned longitudinally-extending member mounted within said outer cylindrical element and having an outer cylindrical wall spaced from said inner wall and a sloping inner end wall, and a plurality of spaced-apart radially-extending wing members interconnecting said outer cylindrical wall with said inner wall and therebetween forming a plurality of slots for fluid passageways, said slots being arranged for at least partial closure to provide a reduced exhaust area to fluid flow upon longitudinal movement of said nozzle against said end wall.

14. A device according to claim 13, wherein said nozzle is displaceable longitudinally by manually effected actuators.

15. A device according to claim 13, wherein said outer cylindrical element extends rearwardly beyond the axially-aligned longitudinally-extending member and sealingly engages said cylindrical shell, and wherein spring means are provided to urge the nozzle against said end wall.

16. A device according to claim 13, wherein said outer cylindrical element includes a rear end having a bearing which bearing is provided with a lip arranged to be guided in a groove extending in the length direction of said cylindrical shell.

17. A device according to claim 16, wherein said cylindrical shell has a front surface which comprises an end wall of said groove.

18. A device according to claim 16, wherein said seal is provided between an inner surface of said outer cylindrical element and an outer surface of said groove.

19. A device according to claim 18, wherein said groove, said lip, and said seal are arranged whereby said outer cylindrical element is displaceable on said cylindrical shell and sealed during the displacement.

20. A device according to claim 19, wherein said outer cylindrical element and said cylindrical shell are provided with interactable threads for adjusting the displacement of said outer cylindrical element with respect to said cylindrical shell.

* * * * *